US011748612B2

(12) United States Patent
Lee et al.

(10) Patent No.: US 11,748,612 B2
(45) Date of Patent: Sep. 5, 2023

(54) NEURAL PROCESSING DEVICE AND OPERATION METHOD THEREOF

(71) Applicant: Postech Academy-Industry Foundation, Pohang-si (KR)

(72) Inventors: Youngjoo Lee, Pohang-si (KR); Sunggu Lee, Pohang-si (KR); Minho Ha, Pohang-si (KR); Younghoon Byun, Pohang-si (KR)

(73) Assignee: POSTECH ACADEMY-INDUSTRY FOUNDATION, Gyeonsangbuk-do (KR)

( * ) Notice: Subject to any disclaimer, the term of this patent is extended or adjusted under 35 U.S.C. 154(b) by 1182 days.

(21) Appl. No.: 16/381,200

(22) Filed: Apr. 11, 2019

(65) Prior Publication Data

US 2020/0104701 A1 Apr. 2, 2020

(30) Foreign Application Priority Data

Sep. 28, 2018 (KR) ........................ 10-2018-0116612

(51) Int. Cl.
*G06N 3/08* (2023.01)
*G06N 5/04* (2023.01)

(52) U.S. Cl.
CPC ................. *G06N 3/08* (2013.01); *G06N 5/04* (2013.01)

(58) Field of Classification Search
CPC .......... G06N 3/08; G06N 5/04; G06N 3/0445; G06N 3/049; G06N 3/0454; G06N 3/04
See application file for complete search history.

(56) References Cited

U.S. PATENT DOCUMENTS 10,963,738 B2 *  3/2021  Geraci ................... G06N 3/063

FOREIGN PATENT DOCUMENTS

| JP | 2006-140952 A | 6/2006 |
| JP | 2016-180839 A | 10/2016 |
| KR | 10-2017-0044933 A | 4/2017 |

OTHER PUBLICATIONS

Dosselmann, R. W., & Yang, X. D. (2012). No-reference noise and blur detection via the fourier transform. Dept. of Computer Science, Univ. of Regina. Regina, SK (Saskatchewan), Canada. (Year: 2012).*
Khaw, H. Y., Soon, F. C., Chuah, J. H., & Chow, C. O. (2017). Image noise types recognition using convolutional neural network with principal components analysis. IET Image Processing, 11(12), 1238-1245. (Year: 2017).*
Hegde, K., Yu, J., Agrawal, R., Yan, M., Pellauer, M., & Fletcher, C. (Jun. 2018). Ucnn: Exploiting computational reuse in deep neural networks via weight repetition. In 2018 ACM/IEEE 45th Annual International Symposium on Computer Architecture (ISCA) (pp. 674-687). IEEE. (Year: 2018).*
(Continued)

*Primary Examiner* — Luis A Sitiriche
(74) *Attorney, Agent, or Firm* — Harness, Dickey & Pierce, P.L.C.

(57) ABSTRACT

Provided is a neural processing device including a noise classifier configured to perform a preprocessing on input data to determine a noise characteristic of the input data, a network selector configured to select one of a plurality of neural networks based on the noise characteristic, and an operator configured to perform inference on the input data based on selected weights corresponding to the selected neural network.

16 Claims, 15 Drawing Sheets

(56) References Cited

OTHER PUBLICATIONS

Remez, T., Litany, 0., Giryes, R., & Bronstein, A. M. (2018). Class-aware fully convolutional Gaussian and Poisson denoising. IEEE Transactions on Image Processing, 27(11), 5707-5722. (Year: 2018).*

Chuah, J. H., Khaw, H. Y., Soon, F. C., & Chow, C. O. (Nov. 2017). Detection of Gaussian noise and its level using deep convolutional neural network. In TENCON 2017-2017 IEEE Region 10 Conference (pp. 2447-2450). IEEE. (Year: 2017).*

Yiren Zhou, et al. "On Classification of Distorted Images with Deep Convolutional Neural Networks", arXiv preprint arXiv:1701.01924, Jan. 8, 2017.

Kaiming He, et al., "Deep Residual Learning for Image Recongition", in Proc. of the IEEE Conf. on Comput. Vision and Pattern Recongition (CVPR), 2016.

Christian Szegedy, et al., "Inception-v4, Inception-ResNet and the Impact of Residual Connections on Learning", in Proc. Association Adv. Artificial Intell. (AAAI), pp. 4278-4284, 2017.

Sergey Zagoruyko, et al. "Wide Residual Networks", arXiv preprint arXiv:1605.07146, Jan. 14, 2016.

Yuxiang Gao, et al. "Performance and Power Analysis of High-Density Multi-GPGPU Architectures: A Preliminary Case Study", 2015 IEEE 17th International Conference on High Performance Computing and Communications (HPCC-ICESS-CSS 2015), 2015.

Song Han, et al., "Deep Compression: Compression Deep Neutral Networks with Pruning, Trained Quantization and Huffman Coding," ICLR 2016, Feb. 15, 2016.

Korean Office Action dated Jan. 6, 2020 for corresponding Korean Application No. 10-2018-0116612.

\* cited by examiner

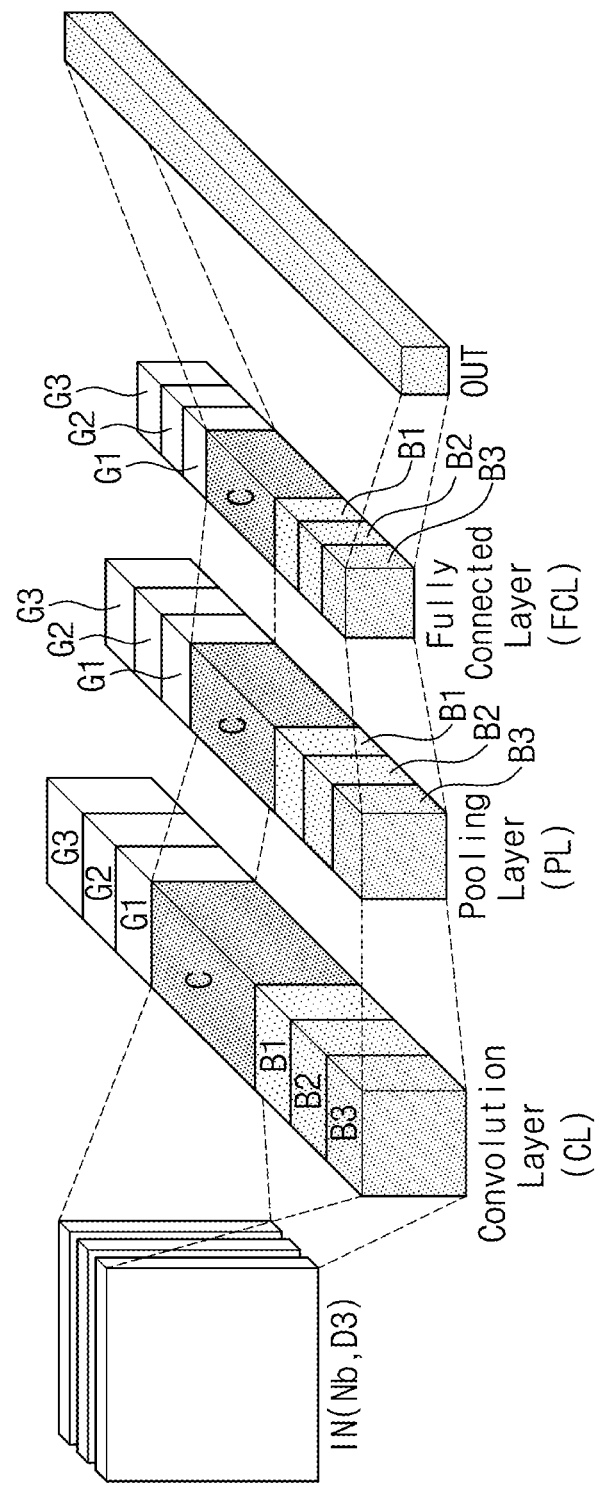

NEURAL PROCESSING DEVICE AND OPERATION METHOD THEREOF

CROSS-REFERENCE TO RELATED APPLICATIONS

This U.S. non-provisional patent application claims priority under 35 U.S.C. § 119 of Korean Patent Application No. 10-2018-0116612, filed on Sep. 28, 2018, the entire contents of which are hereby incorporated by reference.

BACKGROUND

The present disclosure herein relates to a processing device, and more particularly, to a neural processing device for performing inference based on a neural network for input data including noise and an operation method thereof.

A neural network is a network for processing data by imitating human brains. The brain may transmit signals from one neuron to another through synapses between neurons. The brain may adjust the intensity of the signal transmitted from neurons to other neurons by adjusting the synaptic connection strength. That is, information may be learned and inferred by adjusting the synaptic connection strength.

A neural processing device is a device that processes input data based on an artificial neural network algorithm. An artificial neural network algorithm may be generally divided into a learning process and an inference process for input data. The neural processing device may perform inference on the input data based on the learning results obtained through the learning process. An inference method using approximate operation may be utilized to implement a neural processing device using a limited hardware resource. For example, a neural processing device may perform inference based on a simplified neural network. Thus, the amount of operation may be reduced.

In inferring input data, even if the neural processing device performs inference using an approximate operation, the accuracy of the inference result may be high. However, when noise is included in the input data, the accuracy of the inference result may be drastically reduced depending on the intensity of the noise. Further, when more resources are allocated to increase the accuracy of the inference result, the operation time may be increased, and the power consumption according to the operation may be increased.

SUMMARY

The present disclosure is to provide a neural processing device capable of improving the accuracy of inference results while consuming less power for input data including noise and an operation method thereof.

An embodiment of the inventive concept provides a neural processing device including: a noise classifier configured to perform a preprocessing on input data to determine a noise characteristic of the input data; a network selector configured to select one of a plurality of neural networks based on the noise characteristic; and an operator configured to perform inference on the input data based on selected weights corresponding to the selected neural network.

In an embodiment, the noise characteristic may include a noise type and a noise degree of the input data.

In an embodiment, the noise classifier may determine the noise type and the noise degree based on Fourier transform values of the input data.

In an embodiment, when a sum of the Fourier transform values is greater than a maximum value of a reference range, the noise classifier may determine the noise type as Gaussian noise, and when the sum of the Fourier transform values is less than a minimum value of the reference range, the noise classifier may determine the noise type as a blur noise.

In an embodiment, the noise classifier may determine the noise degree based on the magnitude of the sum of the Fourier transform values.

In an embodiment, the noise classifier may determine the noise type and the noise degree based on a neural network.

In an embodiment, each of the plurality of neural networks may be a network learned based on input data including noise corresponding to each of the combinations of the noise type and the noise degree.

In an embodiment, the network selector may include a weight table configured to store a weight address of a neural network corresponding to the noise characteristic.

In an embodiment, the neural processing device may further include a memory configured to store weights of the plurality of neural networks and output the selected weights based on the weight address corresponding to the selected neural network.

In an embodiment of the inventive concept, an operation method of a neural processing device includes: determining a noise characteristic of input data based on Fourier transform values of the input data; selecting one of a plurality of neural networks based on the noise characteristic; and performing inference on the input data based on selected weights corresponding to the selected neural network.

In an embodiment, the noise characteristic may include a noise type and a noise degree of the input data.

In an embodiment, when a sum of the Fourier transform values is greater than a maximum value of a reference range, the noise type may be determined as Gaussian noise, and when the sum of the Fourier transform values is less than a minimum value of the reference range, the noise type may be determined as a blur noise.

In an embodiment, the noise degree may be determined based on the magnitude of the sum of the Fourier transform values.

In an embodiment, the method may further include learning weights corresponding to each of the plurality of neural networks based on input data including noise corresponding to each of the combinations of the noise type and the noise degree, wherein the inference may be performed based on the learned weights.

In an embodiment of the inventive concept, an operation method of a neural processing device may include: determining a noise characteristic of input data based on a specific neural network; selecting one of a plurality of neural networks based on the noise characteristic; and performing inference on the input data based on selected weights corresponding to the selected neural network.

In an embodiment, the noise characteristic may include a noise type and a noise degree of the input data.

In an embodiment, the specific neural network may be a Convolutional Neural Network (CNN).

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 9A and 9B illustrate an example of the operation of the neural processing device of FIG. 3;

DETAILED DESCRIPTION

In the following, embodiments of the inventive concept will be described in detail so that those skilled in the art easily carry out the inventive concept.

Figure 1:
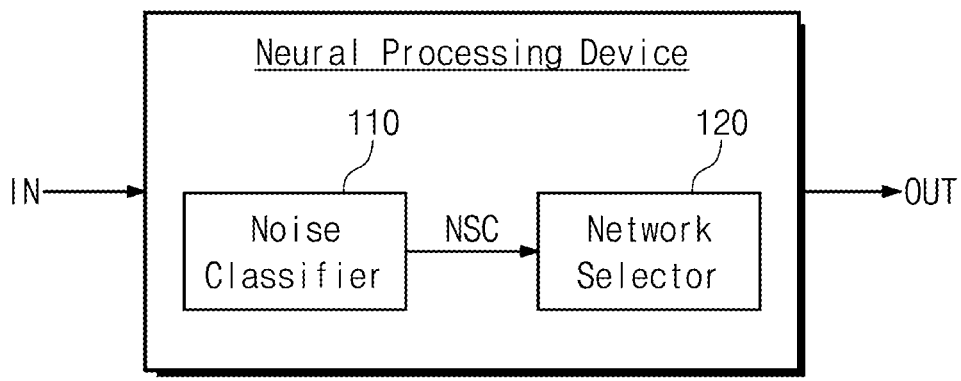
FIG. 1 is a block diagram illustrating a neural processing device according to an embodiment of the inventive concept.

FIG. 1 is a block diagram illustrating a neural processing device according to an embodiment of the inventive concept. Referring to FIG. 1, a neural processing device 100 may receive input data IN. The neural processing device 100 may perform inference on the input data IN. The neural processing device 100 may output the result data OUT as an inference result. For example, the neural processing device 100 may receive an image that includes a number as input data IN. The neural processing device 100 may identify the number in the image. The neural processing device 100 may output the identified number as result data OUT.

The neural processing device 100 may perform inference using a neural network. In exemplary embodiments, neural processing device 100 may perform inference based on one of a plurality of neural networks. For example, a plurality of neural networks according to embodiments of the inventive concept may be configured based on a convolutional neural network (CNN). However, the inventive concept is not limited thereto, and a plurality of neural networks may be configured based on various types of neural networks such as a recurrent neural network (RNN) and a spiking neural network (SNN).

The neural processing device 100 may include a noise classifier 110 and a network selector 120. The noise classifier 110 may pre-process the input data IN. The noise classifier 110 may determine the noise characteristic NSC of the input data IN through preprocessing. The noise characteristic NSC may include various information of the noise in the input data IN. For example, the noise characteristic NSC may include a noise type and a noise degree.

The network selector 120 may select one of the plurality of neural networks based on the noise characteristics NSC. The plurality of neural networks may be pre-learned based on the input data IN including various noise characteristics NSC. The network selector 120 may select one of the previously learned neural networks.

Each of the plurality of neural networks may be a neural network corresponding to the input data IN having a specific noise characteristic NSC. For example, the first neural network may be a neural network corresponding to input data IN having a first noise characteristic NSC and the second neural network may be a neural network corresponding to input data IN having a second noise characteristic NSC. That is, the network selector 120 may select a neural network corresponding to the noise characteristic NSC among the plurality of neural networks.

When the inference for the input data IN is performed using the corresponding neural network, the neural processing device 100 may perform inference with a desired accuracy while using less computational resources. That is, the computation amount of the neural processing device 100 may be reduced.

As described above, the neural processing device 100 may perform inference based on the noise characteristics NSC of the input data IN to reduce the computation amount while maintaining the desired accuracy. Thus, the neural processing device 100 may perform inference with low power.

Figure 2:
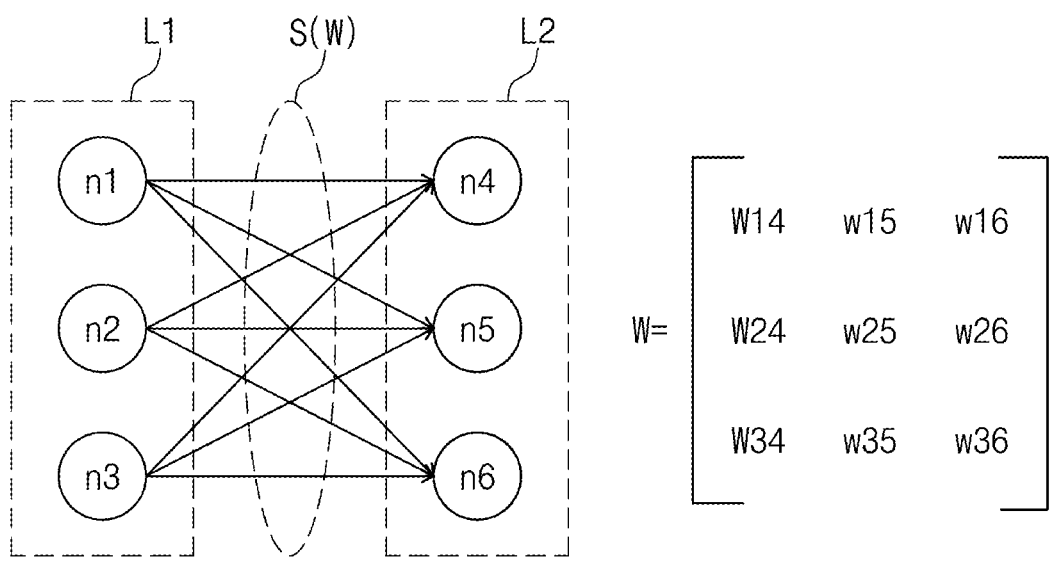
FIG. 2 illustrates a neural network according to an embodiment of the inventive concept.

FIG. 2 illustrates a neural network according to an embodiment of the inventive concept. That is, FIG. 2 may be one of a plurality of neural networks according to an embodiment of the inventive concept. Referring to FIG. 2, the neural network may include a first layer L1, a second layer L2, and synapses S. The first layer L1 may include first to third neurons n1 to n3 and the second layer L2 may include fourth to sixth neurons n4 to n6. The neurons n1 to n3 of the first layer L1 may be connected to the neurons n4 to n6 of the second layer L2 through the synapses S. The neurons n1 to n3 may transmit signals to the neurons n4 to n6 through the synapses S.

Each of the synapses S may have different connection strengths. The connection strength of each of the synapses S may be expressed as a weight. For example, the weight w14 may be a weight value of a synapse connecting the first neuron n1 and the fourth neuron n4, and the weight w24 may be a weight value of a synapse connecting the second neuron n2 and the fourth neuron n4.

The weights W corresponding to the synapses S may indicate the connection state of the neural network. For example, as shown in FIG. 2, when the neurons n1 to n3 of the first layer L1 and the neurons n4 to n6 of the second layer L2 are fully connected, the values of the weights W may not be all '0'. Unlike what is shown in FIG. 2, if the third neuron n3 and the sixth neuron n6 are not connected, the weight w36 may be '0'.

Accordingly, the weights W may be parameters indicating the configuration of the neural network. Different weights W may indicate different neural networks. That is, selecting the neural network by the network selector 120 may mean that the weights W are selected.

As shown in FIG. 2, neural networks according to an embodiment of the inventive concept may include two layers L1 and L2 and six neurons n1 to n6, but the inventive concept is not limited thereto. For example, neural networks according to embodiments of the inventive concept may include various numbers of layers and neurons. Hereinafter, for convenience of explanation, as shown in FIG. 2, it is assumed that the neural processing device 100 performs inference based on neural networks including the two layers L1 and L2 and the six neurons n1 to n6.

Figure 3:
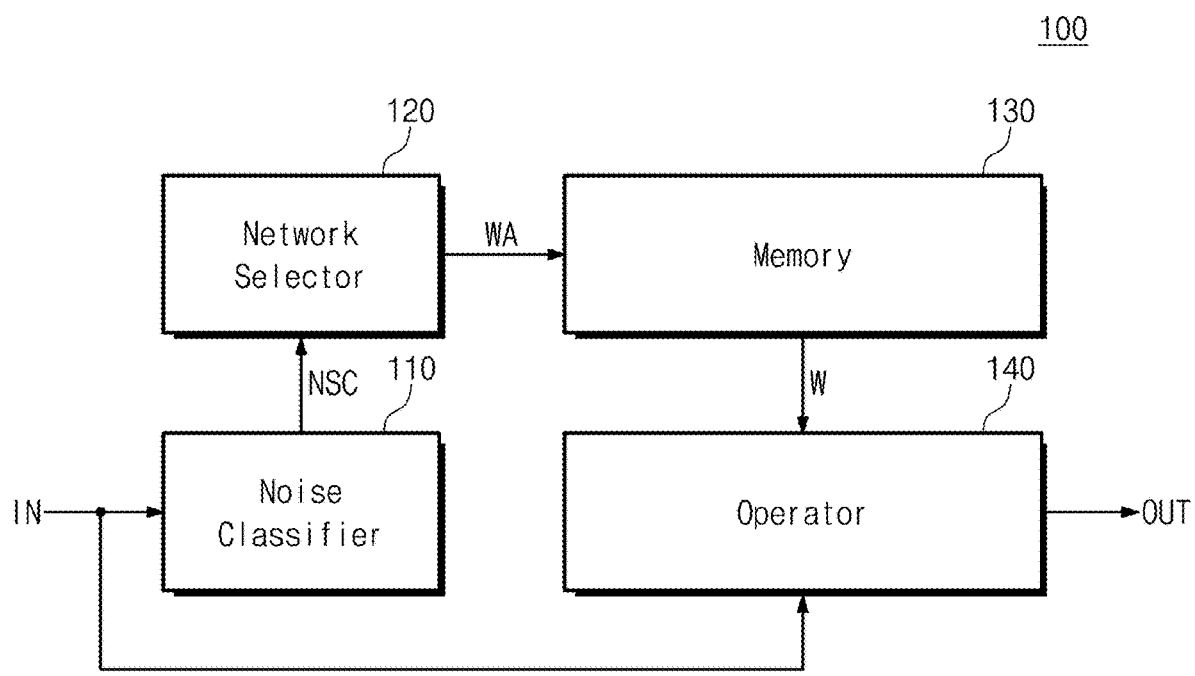
FIG. 3 is a detailed block diagram of the neural processing device of FIG. 1.

FIG. 3 is a detailed block diagram of the neural processing device of FIG. 1. Referring to FIG. 1, a neural processing device 100 may include a noise classifier 110, a network selector 120, a memory 130, and an operator 140.

The noise classifier 110 may receive the input data IN. The noise classifier 110 may pre-process the input data IN to determine a noise characteristic NSC included in the input data IN. For example, the noise characteristic NSC may include a noise type and a noise degree. The noise classifier 110 may provide the determined noise characteristics NSC to the network selector 120.

The network selector 120 may select one of the plurality of neural networks based on the noise characteristics NSC. The network selector 120 may output a weight address WA corresponding to the selected neural network. The weight address WA may be the address information of the memory 130 in which the weights W of the neural network are stored. For example, when the network selector 120 selects the neural network of FIG. 2, the weight address WA may be the address information of the memory 130 in which the weights W are stored. The network selector 120 may provide a weight address WA to the memory 130.

The memory 130 may output the weights W based on the weight address WA. The outputted weights W may be provided to the operator 140.

The operator 140 may receive the weights W and the input data IN. The operator 140 may perform operations using the weights W and the input data IN. For example, the operator 140 may perform multiplication of the weights W and the input data IN. The operator 140 may accumulate the multiplication results of the weights W and the input data IN. That is, the operator 140 may include a multiplier and an accumulator. The operator 140 may perform inference on the input data IN through various operations such as multiplication and accumulation. The operator 140 may output the result data OUT as an inference result.

Hereinafter, the operation of the neural processing device of FIG. 3 will be described in detail with reference to FIGS. 4 to 9.

Figure 4:
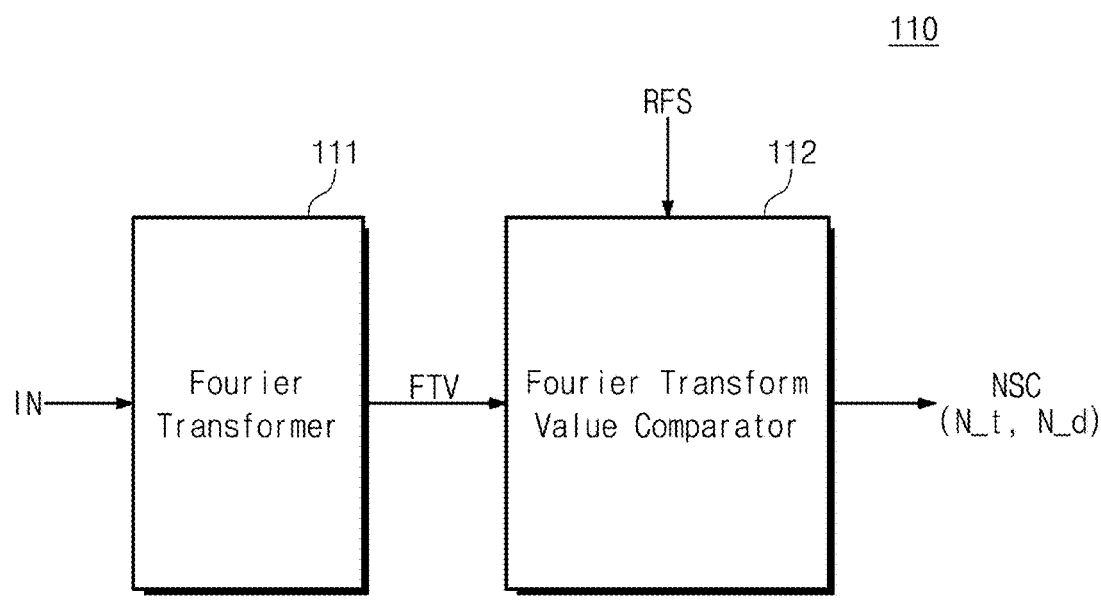
FIG. 4 is a block diagram illustrating one example of a noise classifier of FIG. 3.
Figure 5:
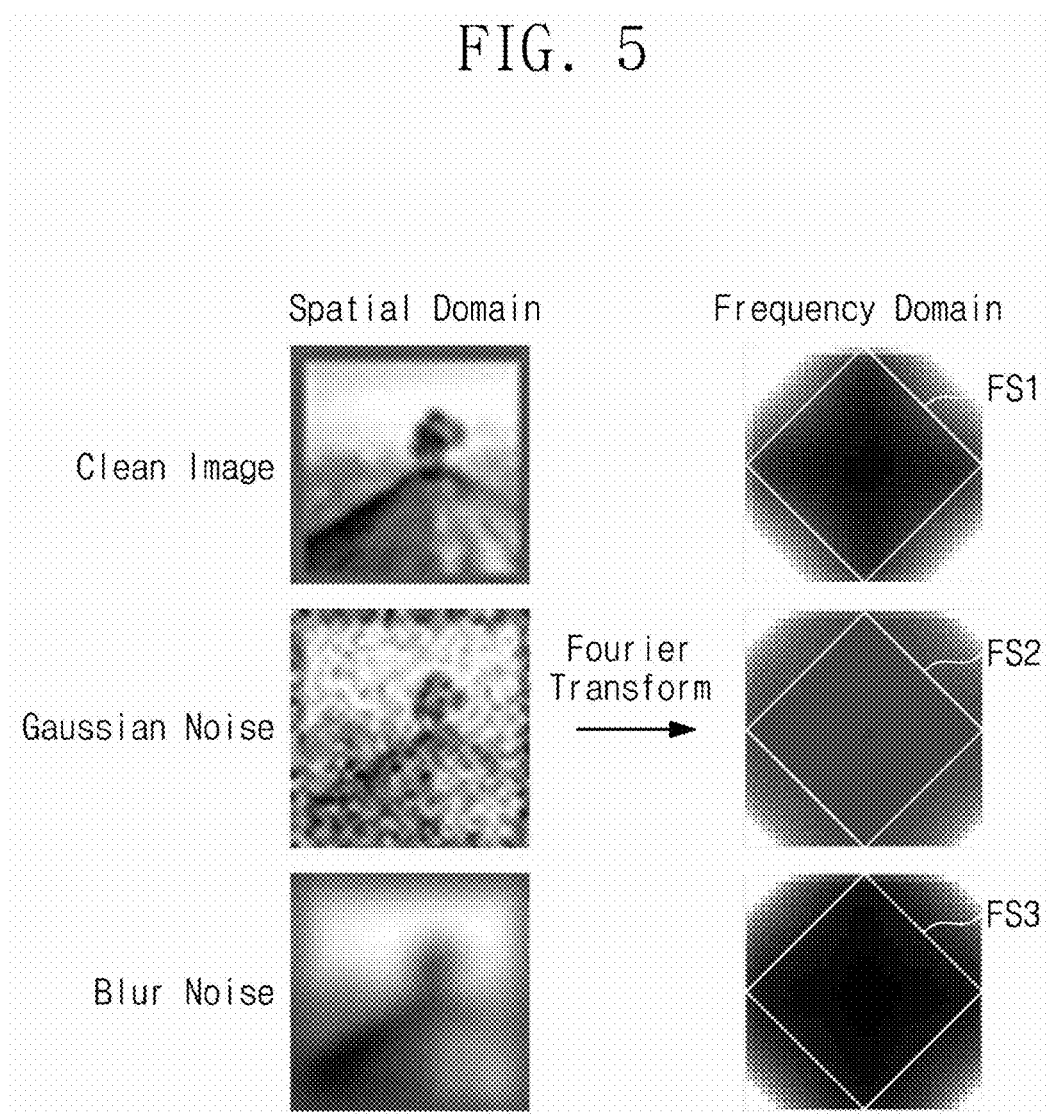
FIG. 5 illustrates an example of Fourier transform according to the operation of the noise classifier of FIG. 4.

FIG. 4 is a block diagram illustrating one example of a noise classifier of FIG. 3. FIG. 5 illustrates an example of Fourier transform according to the operation of the noise classifier of FIG. 4. Referring to FIG. 4, the noise classifier 110 may include a Fourier transformer 111 and a Fourier transform value comparator 112.

The Fourier transformer 111 may perform a Fourier transform on the input data IN. The Fourier transformer 111 may obtain the value of the frequency domain from the value of the spatial domain of the input data IN. The Fourier transformer 111 may output the Fourier transform value FTV which is the value of the frequency domain of the input data IN. For example, the Fourier transformer 111 may output a Fourier transform value FTV by performing Fast Fourier Transform (FFT).

For example, referring to FIG. 5, the input data IN may be an image. The image may include noise or may not include noise. An image without noise may be referred to as a clean image. The image including the noise may include Gaussian noise or blur noise. Gaussian noise may be caused by vibration due to thermal energy of an atom or radiation due to heat energy. Blur noise may be caused by lens shake when capturing a picture or an image. However, the inventive concept is not limited thereto, and the image may include various types of noise. For example, an image may include noise generated by an object being covered when photographing. As shown in FIG. 5, the objects of the clean image may be clearly distinguished, but the objects of the noise-containing image may not be clearly distinguished.

The Fourier transformer 111 may perform a Fourier transform on the pixel values of the image. The Fourier transformer 111 may obtain Fourier transform values for the pixel values. The Fourier transform values may vary depending on the noise type. For example, an image including Gaussian noise may further include a high frequency value compared to an image including blur noise. Accordingly, the Fourier transform values of the image including the Gaussian noise may be larger than the Fourier transform values of the image including the blur noise.

That is, the sum of the Fourier transform values in a specific region of the image may vary depending on the noise type. As shown in FIG. 5, the sum FS1 of the Fourier transform values in a specific area of the clean image, the sum FS2 of the Fourier transform values in a specific area of the image including the Gaussian noise, and the sum FS3 of the Fourier transform values in a specific region of the Fourier transform may be different from each other. For example, the sum FS1 of the Fourier transform values of the clean image may be smaller than the sum FS2 of the Fourier transform values of the image including the Gaussian noise. The sum FS1 of the Fourier transform values of the clean image may be larger than the sum FS3 of the Fourier transform values of the image including the blur noise.

Referring again to FIG. 4, the Fourier transform value comparator 112 may receive the Fourier transform value FTV. The Fourier transform value comparator 112 may compare the sum of the Fourier transform values FTV with a reference range RFS. The reference range RFS may be a range of sum of values of a frequency domain determined in the learning process for the input data IN. That is, reference range RFS is a range of values to determine the noise characteristics of the input data IN from the sum of the Fourier transform values FTV. The reference range RFS may be stored in an internal memory (not shown) or in an external memory (e.g., memory 130) of the noise classifier 110.

For example, if an image including Gaussian noise is provided as input data IN, the Fourier transform value comparator 112 may compare the reference range RFS and the sum of the Fourier transform values FS2.

The Fourier transform value comparator 112 may determine the noise characteristic NSC based on the comparison result. The noise characteristic NSC may include a noise type N_t and a noise degree N_d. For example, when the sum of the Fourier transform values FTV is within the reference range RFS, the Fourier transform value comparator 112 determines the noise type N_t of the input data IN as a clean image (i.e., it is determined that noise is not included). When the sum of the Fourier transform values FTV is larger than the maximum value of the reference range RFS, the Fourier transform value comparator 112 may determine the noise type N_t of the input data IN as Gaussian noise. When the sum of the Fourier transform values FTV is smaller than the minimum value of the reference range RFS, the Fourier transform value comparator 112 may determine the noise type N_t of the input data IN as blur noise.

The Fourier transform value comparator 112 may determine the noise degree N_d based on the difference between the sum of the Fourier transform values FTV and the minimum value or the maximum value of the reference range RFS. For example, if the difference between the sum of the Fourier transform values FTV and the minimum value or the maximum value of the reference range RFS is less than or equal to the first threshold value, the Fourier transform value comparator 112 may determine the noise degree N_d of the input data IN as the first degree. When the difference between the sum of the Fourier transform values FTV and the minimum value or the maximum value of the reference range RFS exceeds the first threshold value and is equal to or less than the second threshold value, the Fourier transform value comparator 112 may determine the noise degree N_d of the input data IN as the second degree.

That is, when the sum of the Fourier transform values FTV is greater than the maximum value of the reference range RFS and the difference is less than the first threshold value, the Fourier transform value comparator 112 may determine the noise type N_t of the input data IN as Gaussian noise and determine the noise degree N_d as the first degree.

Figure 6:
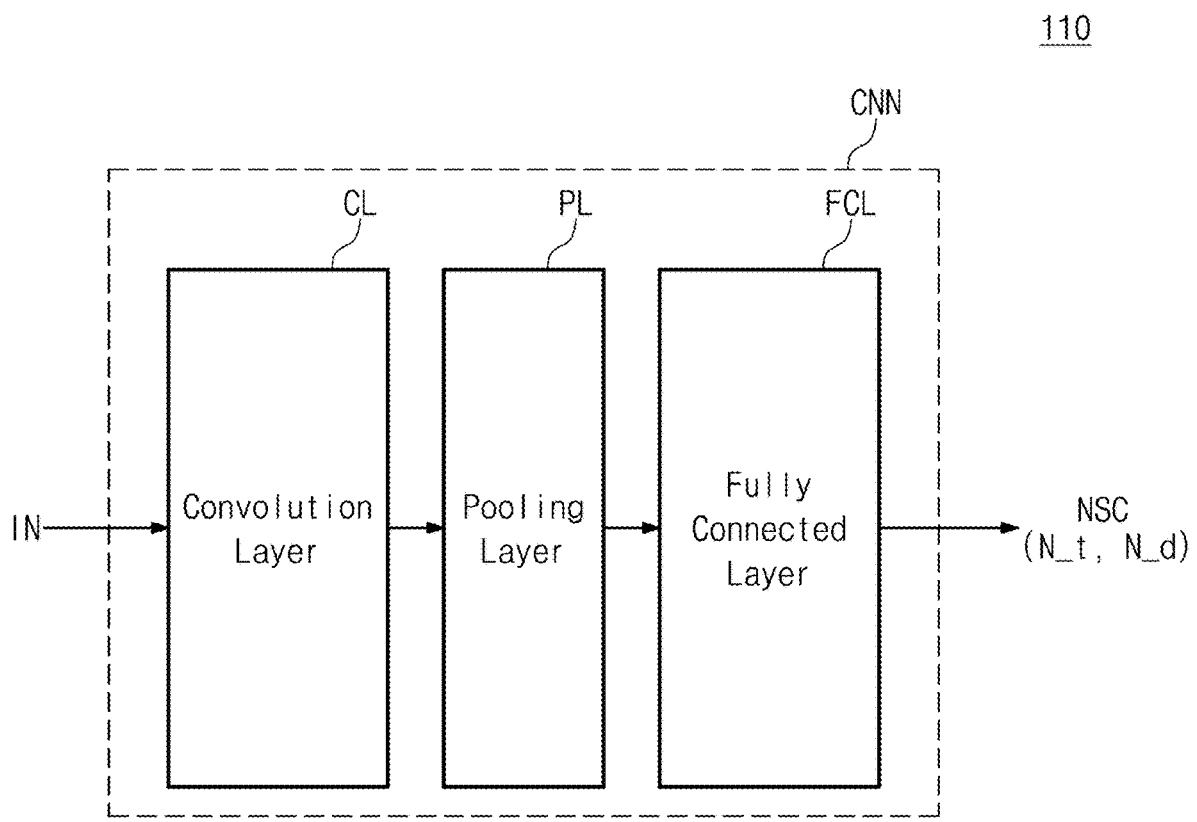
FIG. 6 illustrates another example of the noise classifier of FIG. 3.

FIG. 6 illustrates another example of the noise classifier of FIG. 3. Referring to FIG. 6, the noise classifier 110 may determine a noise characteristic NSC for the input data IN using a neural network. The neural network used in the noise classifier 110 may be different from the neural network used in the operator 140 in FIG. 3. That is, the neural network for determining the noise characteristic NSC of the input data IN and the neural network for inference may be different. For example, the neural network used in the noise classifier 110 may include fewer layers and neurons than the neural network used in the operator 140. That is, the size of the neural network used in the noise classifier 110 may be smaller than the size of the neural network used in the operator 140.

As shown in FIG. 6, the noise classifier 110 may determine a noise characteristic NSC based on a convolutional neural network (CNN). The CNN may include a convolution layer CL, a pooling layer PL, and a fully connected layer FCL.

The noise classifier 110 may extract the feature data from the input data IN through the convolution layer CL. The noise classifier 110 may sample the extracted feature data through the pooling layer PL. The noise classifier 110 may determine the noise characteristic NSC from the sampled data through the fully connected layer FCL.

For example, when an image including blur noise of a second degree is provided as input data IN, the noise classifier 110 may determine a noise characteristic NSC based on a neural network. The noise classifier 110 may determine that the noise type N_t of the input data IN is blur noise and the noise degree N_d is the second degree.

In FIG. 6, the convolution layer CL, the pooling layer PL, and the fully connected layer FCL are shown as one, but the inventive concept is not limited thereto. For example, the noise classifier 110 may determine the noise characteristics NSC of the input data IN by using various numbers of convolution layers CL, pooling layers PL, and fully connected layers FCL.

Figure 7:
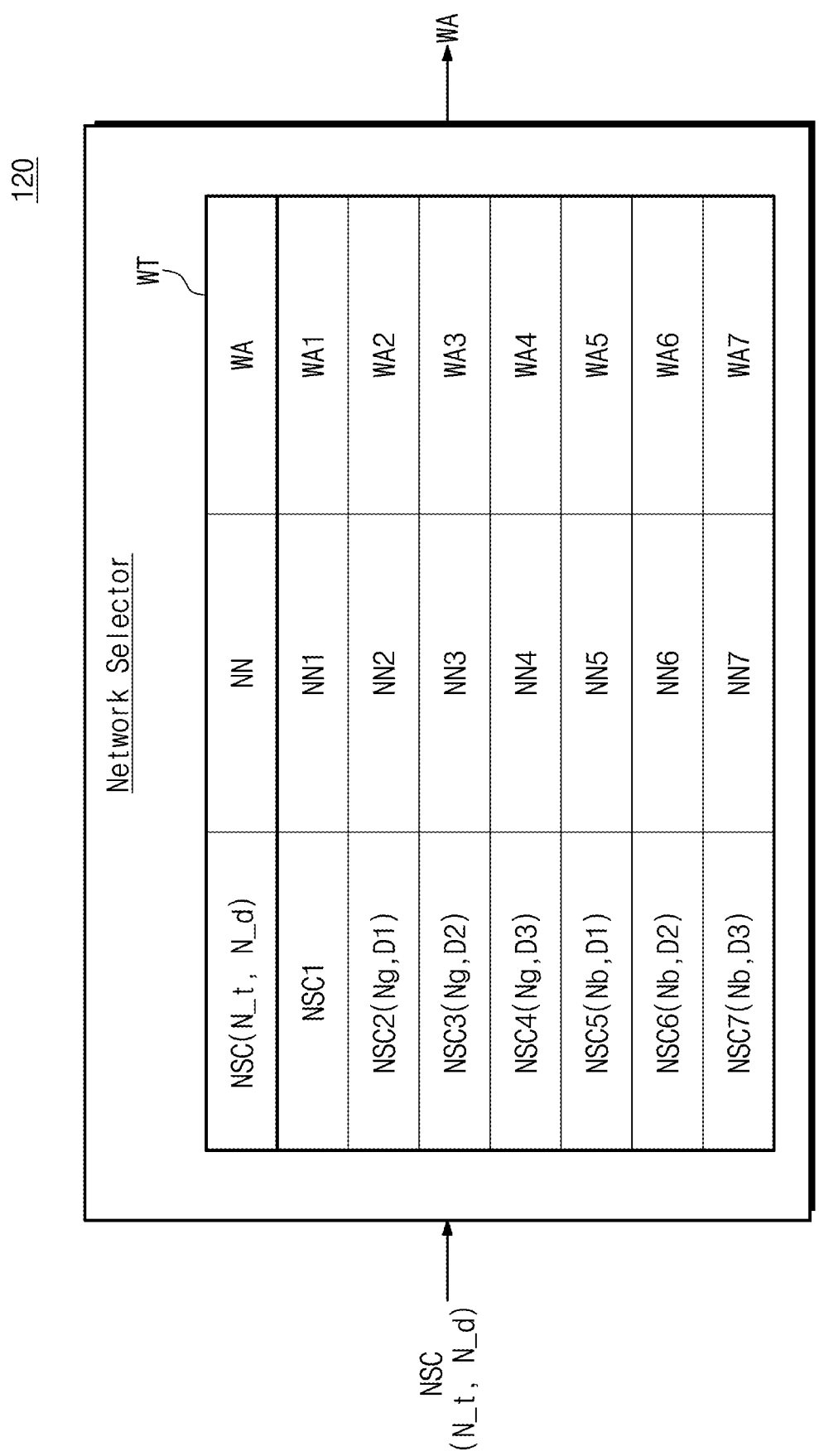
FIG. 7 illustrates one example of the network selector of FIG. 3.

FIG. 7 illustrates one example of the network selector of FIG. 3. Referring to FIG. 7, the network selector 120 may receive a noise characteristic NSC. The network selector 120 may determine a weight address WA and a neural network NN corresponding to the received noise characteristics NSC based on the weight table WT. The network selector 120 may output the determined weight address WA.

As shown in FIG. 7, the network selector 120 may include the weight table WT. The weight table WT may include a noise characteristic (NSC) field, a neural network (NN) field, and a weight address (WA) field. The weight table WT may be stored in a memory within the network selector 120, but the inventive concept is not limited thereto.

The first to seventh noise characteristics NSC1 to NSC7 may be included in the noise characteristic (NSC) field according to the noise type N_t and the noise degree N_d. For example, the first noise characteristic NSC1 may indicate that no noise is included in the input data IN. The second noise characteristic NSC2 may indicate that the input data IN includes Gaussian noise Ng of the first degree D1. The seventh noise characteristic NSC7 may indicate that the input data IN includes the blur noise Nb of the third intensity D3.

The first to seventh neural networks NN1 to NN7 may be included in the neural network (NN) field. The first to seventh neural networks NN1 to NN7 may correspond to the first to seventh noise characteristics NSC1 to NSC7, respectively. For example, the first neural network NN1 may correspond to the first noise characteristic NSC1, and the second neural network NN2 may correspond to the second noise characteristic NSC2.

If no noise is included in the input data IN, the first neural network NN1 may be a neural network corresponding to the input data IN. That is, when the inference for the input data IN is performed using the first neural network NN1, the inference may be performed with the minimized computation amount and the desired accuracy.

When the input data IN includes Gaussian noise Ng of the first degree D1, the second neural network NN2 may be a neural network corresponding to the input data IN. That is, when the inference for the input data IN is performed using the second neural network NN2, the inference may be performed with the minimized computation amount and the desired accuracy.

In this case, the first neural network NN1 may have a larger sparsity than the second neural network NN2. For example, the weights W of the first neural network NN1 may include more a weight of '0' than the weights W of the second neural network NN2. Or, the values of the weights W of the first neural network NN1 may be smaller than the weights W of the second neural network NN2. Accordingly, inference for the input data IN without noise may be performed more approximately than inference for the input data IN including noises. Accordingly, the computation amount based on the first neural network NN1 may be less than the computation amount based on the second neural network NN2. The inference for the input data IN without noise may have a desired accuracy, even when it is performed more approximately than when the input data IN includes noise.

When inference is performed on the input data IN without noise using the second neural network NN2, inference may be performed by the desired accuracy, but the computation amount may be increased. Thus, in order for inference to be performed with the minimized computation amount and the desired accuracy for the input data IN not including noise (i.e., the first noise characteristic NSC1), the first neural network NN1 may correspond to the first noise characteristic NSC1.

Likewise, in order for inference to be performed with the minimized computation amount and the desired accuracy for the input data IN of the third noise characteristic NSC3, the third neural network NN3 may correspond to the third noise characteristic NSC3. In order for inference to be performed with the minimized computation amount and the desired accuracy for the input data IN of the fourth noise characteristic NSC4, the fourth neural network NN4 may correspond to the fourth noise characteristic NSC4. In this case, the third neural network NN3 may have a larger sparseness than the fourth neural network NN4. For example, the weights W of the third neural network NN3 may include more a weight of '0' than the weights W of the fourth neural network NN4. Alternatively, the values of the weights W of the third neural network NN3 may be smaller than the weights W of the fourth neural network NN4. Accordingly, the inference for the input data IN including the noise of the second degree may be performed more approximately than the inference for the input data IN including the noise of the third intensity. That is, as the intensity $N\_d$ of noise increases, the computation amount of the inference may be increased.

As in such a manner, the weight table WT may include information on the neural network NN corresponding to each noise characteristic NSC.

Each of the first to seventh neural networks NN1 to NN7 of FIG. 7 may be a learned neural network based on input data IN including various noise characteristics NSC. The input data IN provided for learning may include noise corresponding to each of the combinations of various noise types $N\_t$ and noise degrees $N\_d$.

The weight address (WA) field may include first to seventh weight addresses WA1 to WA7. The first to seventh weight addresses WA1 to WA7 may correspond to the first to seventh neural networks NN1 to NN7, respectively. For example, the weights W of the first neural network NN1 may be stored in the first weight address WA1 of the memory 130. The weights W of the second neural network NN2 may be stored in the second weight address WA2 of the memory 130.

For example, when the first noise characteristic NSC1 is received, the network selector 120 may output a first weight address WA1 corresponding to the first noise characteristic NSC1. When the second noise characteristic NSC2 is received, the network selector 120 may output a second weight address WA2 corresponding to the second noise characteristic NSC2.

Although it is shown in FIG. 7 that the weight table WT includes a noise characteristic (NSC) field, a neural network (NN) field, and a weight address (WA) field, the inventive concept is not limited thereto. For example, the weight table WT may include only a noise characteristic (NSC) field and a weight address (WA) field.

Although it is shown that the weight table WT of FIG. 7 includes the first to seventh noise characteristics NSC1 to NSC7 and the first to seventh weight addresses WA1 to WA7, the inventive concept is not limited thereto. For example, the weight table WT may include various numbers of noise characteristics NSCs and weight addresses WA corresponding thereto.

Figure 8A:
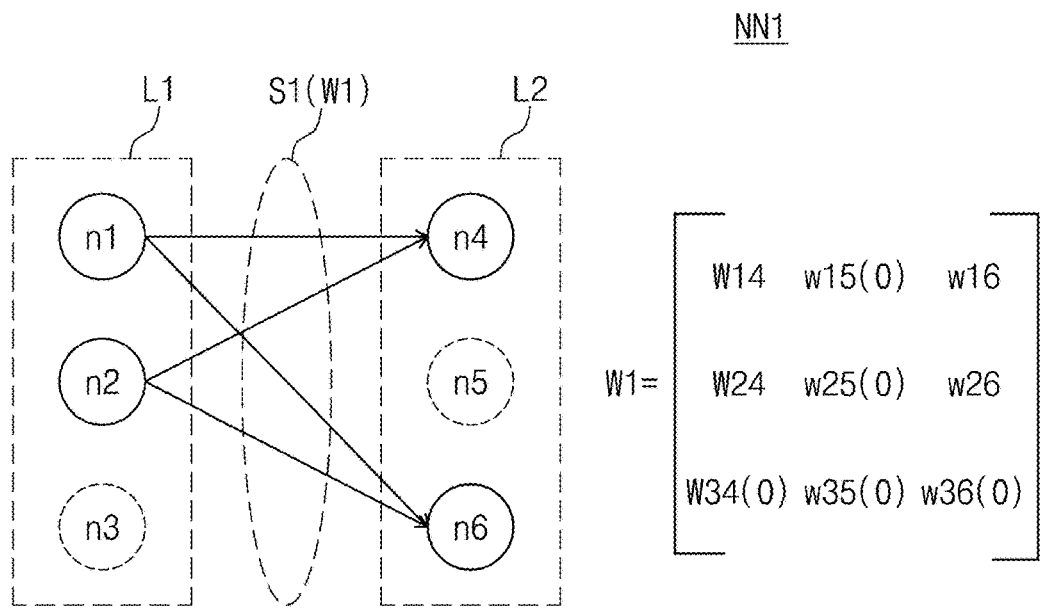
FIGS. 8A to 8C illustrate an example of the neural network of FIG. 7.
Figure 8B:
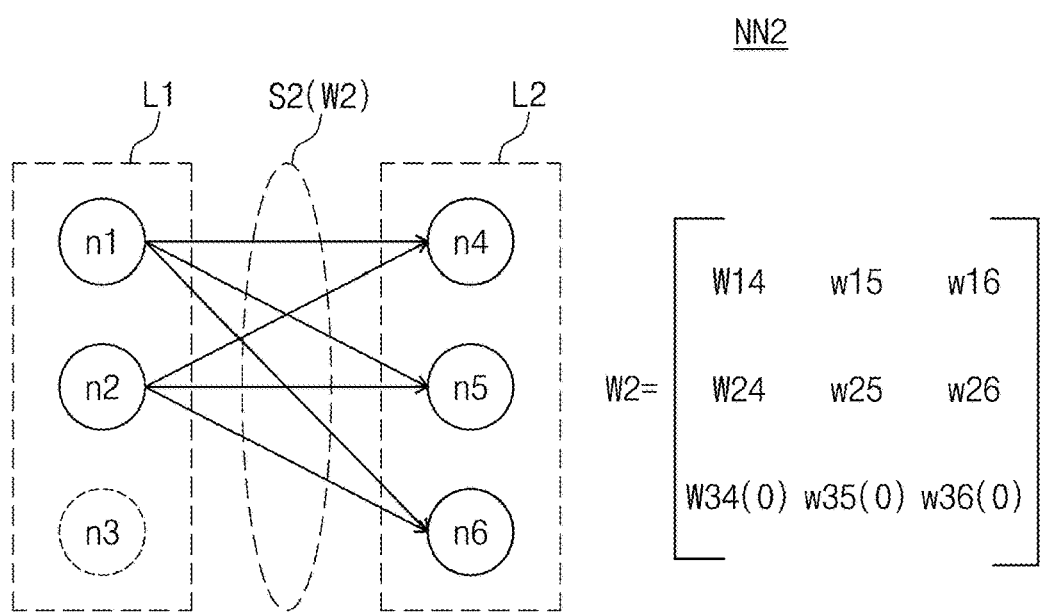
Figure 8C:
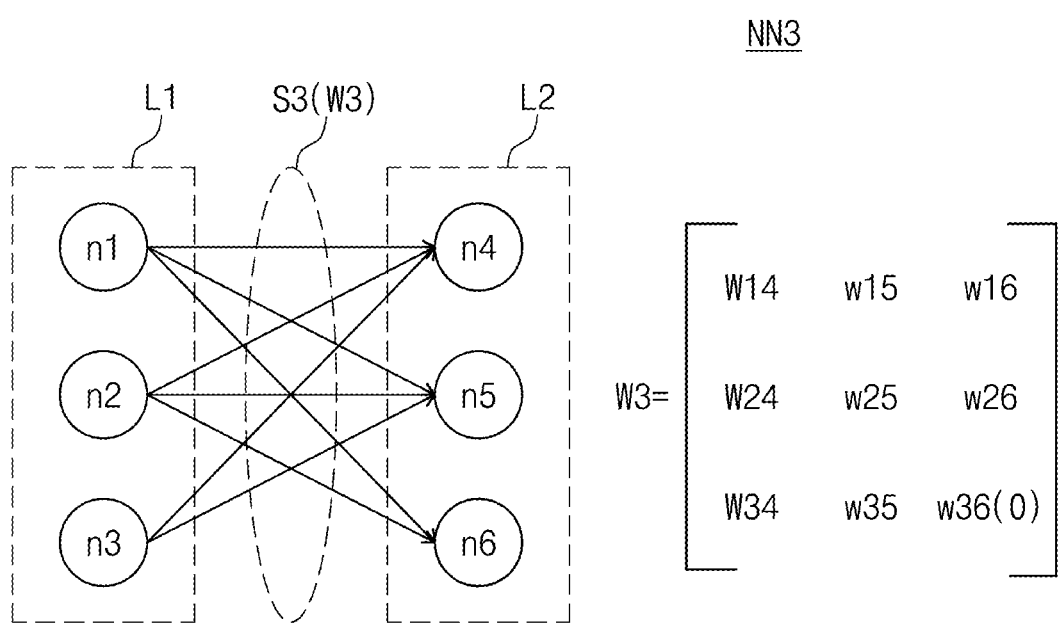

FIGS. 8A to 8C illustrate an example of the neural network of FIG. 7. Specifically, FIG. 8A shows an example of the first neural network NN1 of FIG. 7. FIG. 8B shows an example of the second neural network NN2 of FIG. 7. FIG. 8C shows an example of the third neural network NN3 of FIG. 7.

Referring to FIG. 8A, the first neural network NN1 may include a first layer L1, a second layer L2, and synapses S1. As shown in FIG. 8A, the third neuron n3 is not connected to the neurons n4 to n6, and the fifth neuron n5 is not connected to the neurons n1 to n3. Accordingly, among the first weights W1 of the first neural network NN1, the weights w15, w25, w34, w35, and w36 corresponding to the third neuron n3 and the fifth neuron n5 may be all '0'. Accordingly, when the inference is performed using the first neural network NN1, the computation may be performed approximately to reduce the computation amount.

Referring to FIG. 8B, the second neural network NN2 may include a first layer L1, a second layer L2, and synapses S2. As shown in FIG. 8B, the third neuron n3 may not be connected to the neurons n4 to n6. Accordingly, the weights w34, w35, and w36 corresponding to the third neuron n3 among the second weights W2 of the second neural network NN2 may be all '0'. Therefore, when inference is performed using the second neural network NN2, the computation may be performed more accurately and the computation amount may be increased more than when the inference is performed using the first neural network NN1. That is, the inference operation on the input data IN having the second noise characteristic NSC2 may be performed more accurately than the inference operation on the input data IN having the first noise characteristic NSC1. However, the inference computation amount for the input data IN having the second noise characteristic NSC2 may be increased more than the inference computation amount for the input data IN having the first noise characteristic NSC1.

Referring to FIG. 8C, the third neural network NN3 may include a first layer L1, a second layer L2, and synapses S3. As shown in FIG. 8C, the third neuron n3 may not be connected to the sixth neuron n6. Accordingly, the weight w36 among the third weight W3 of the third neural network NN3 may be '0'. Therefore, when inference is performed using the third neural network NN3, the computation may be performed more accurately and the computation amount may be increased more than when the inference is performed using the second neural network NN2. That is, the inference operation on the input data IN having the third noise characteristic NSC3 may be performed more accurately than the inference operation on the input data IN having the second noise characteristic NSC2. However, the inference computation amount for the input data IN having the third noise characteristic NSC3 may be increased more than the inference computation amount for the input data IN having the second noise characteristic NSC2.

As described above, as the degree $N\_d$ of the noise is increased, the sparsity of the corresponding neural network may be reduced. That is, the network selector 120 may select a neural network having a suitable sparsity among a plurality of neural networks according to the noise characteristics NSC.

Figure 9A:
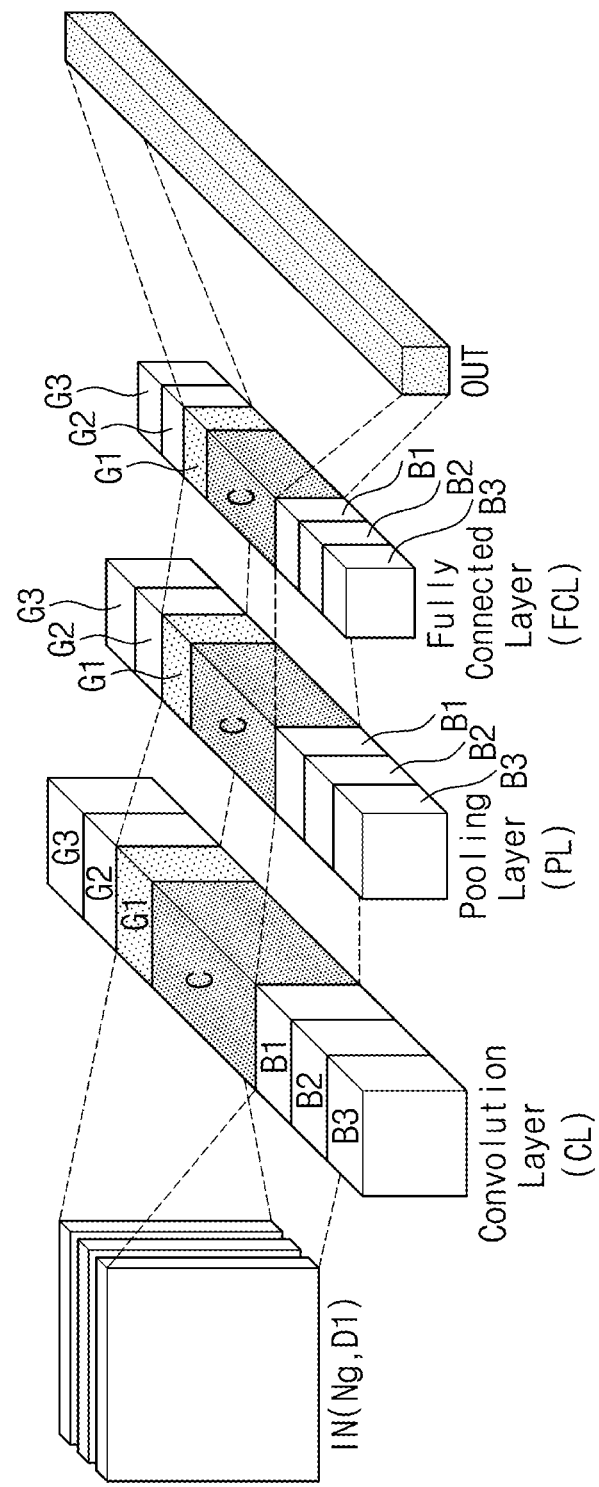

FIGS. 9A and 9B illustrate an example of the operation of the neural processing device of FIG. 3. Specifically, FIG. 9A shows an example in which Gaussian noise Ng of first degree D1 is included in the input data IN. FIG. 9B shows an example in which the blur noise Nb of the third intensity D3 is included in the input data IN.

Referring to FIGS. 9A and 9B, the input data IN may be an image. The input image may be a color image of three channels. For example, pixel values of three channels of red, green, and blue (RGB) of an image may be provided as input data IN. As shown in FIGS. 9A and 9B, when the input data IN of three channels are provided, since the weights W of the neural network are three-dimensional, the neural network used for inference of the input data IN may be shown in three dimensions.

The neural networks of FIGS. 9A and 9B may correspond to the first to seventh neural networks of FIG. 7. For example, the neural network corresponding to weights C may be the first neural network NN1 of FIG. 7. The neural network corresponding to the weights C and G1 may be the second neural network NN2 of FIG. 7.

Similarly, the neural network corresponding to the weights C, G1, and G2 may be the third neural network NN3 of FIG. 7. The neural network corresponding to the weights C, G1, G2, and G3 may be the fourth neural network NN4 of FIG. 7. The neural network corresponding to the weights C and B1 may be the fifth neural network NN5 of FIG. 7. The neural network corresponding to the weights C, B1, and B2 may be the sixth neural network NN6 of FIG. 7. The neural network corresponding to the weights C, B1, B2, and B3 may be the seventh neural network NN7 of FIG. 7.

As shown in FIGS. 9A and 9B, the plurality of neural networks may be a convolutional neural network (CNN) based neural network. A CNN may include a convolution layer CL, a pooling layer PL, and a fully connected layer FCL. The convolution layer CL performs a convolution product process on the input data IN using a filter, and outputs the feature data. The filter may correspond to the weights W of the neural network. The pooling layer PL may perform sampling on the characteristic data outputted from the convolution layer CL. Like the convolution layer CL, a filter may be used for sampling. For example, a pooling layer PL may extract a maximum value from a specific region of feature data using a filter. The filter may correspond to the weights W of the neural network. A fully connected layer FCL may output result data OUT from sampled data using weights W. The result data OUT may be an inference result for the input data IN. For example, the result data OUT may include identification information on an object of an image.

Referring to FIGS. 3 and 9A, it may be determined that the noise classifier 110 receives the input data IN, and the input data IN includes Gaussian noise Ng of the first degree D1. The network selector 120 may select a neural network corresponding to the determined noise characteristic NSC (i.e., Gaussian noise Ng of the first degree D1). The network selector 120 may select a neural network corresponding to the weights C and G1. For example, the network selector 120 may select the second neural network NN2 of FIG. 7. The network selector 120 may output a second weight address WA2 corresponding to the second neural network NN2. The memory 130 may output the weights C and G1 in response to the second weight address WA2. The operator 140 may perform inference on the input data IN based on the weights C and G1.

Referring to FIGS. 3 and 9B, the noise classifier 110 may receive the input data IN and may determine that the input data IN includes the blur noise Nb of the third degree D3. The network selector 120 may select a neural network corresponding to the determined noise characteristic NSC (i.e., the blur noise Nb of the third degree D3). The network selector 120 may select a neural network corresponding to the weights C, B1, B2, and B3. For example, the network selector 120 may select the seventh neural network NN7 of FIG. 7. The network selector 120 may output a seventh weight address WA7 corresponding to the seventh neural network NN7. The memory 130 may output the weights C, B1, B2, and B3 in response to the seventh weight address WA7. The operator 140 may perform inference on the input data IN based on the weights C, B1, B2, and B3.

As described above, the neural processing device 100 may perform inference based on the neural network corresponding to the noise characteristic NSC of the input data IN. In this case, the neural network may vary depending on the noise type $N\_t$ and the noise degree $N\_d$. For example, as the noise degree $N\_d$ is larger, the size of the corresponding neural network may be larger. That is, the neural processing device 100 may perform inference based on a neural network having a small size with respect to the input data IN having a small noise degree $N\_d$. Thus, the neural processing device 100 may perform inference with the desired accuracy using minimized computational resources.

The neural processing device 100 described with reference to FIGS. 1 to 9B may be mounted on a Internet of Things (IoT) sensor, a smartphone, a desktop, a server, or the like. The neural processing device 100 may be included in a central processing unit (CPU), an application processor (AP), a microcontroller (MCU), or an accelerator. However, the inventive concept is not limited thereto, and the neural processing device 100 may be implemented as a separate device or chip.

The neural processing device 100 and the components of the neural processing device 100 may be implemented using any suitable hardware, software, firmware, or a combination of hardware, software, and firmware. In exemplary embodiments, software may be machine code, firmware, embedded code, and application software. For example, hardware may include an electrical circuit, an electronic circuit, a processor, a computer, an integrated circuit, integrated circuit cores, a pressure sensor, an inertial sensor, microelectromechanical systems (MEMS), a passive device, or a combination thereof.

Figure 10:
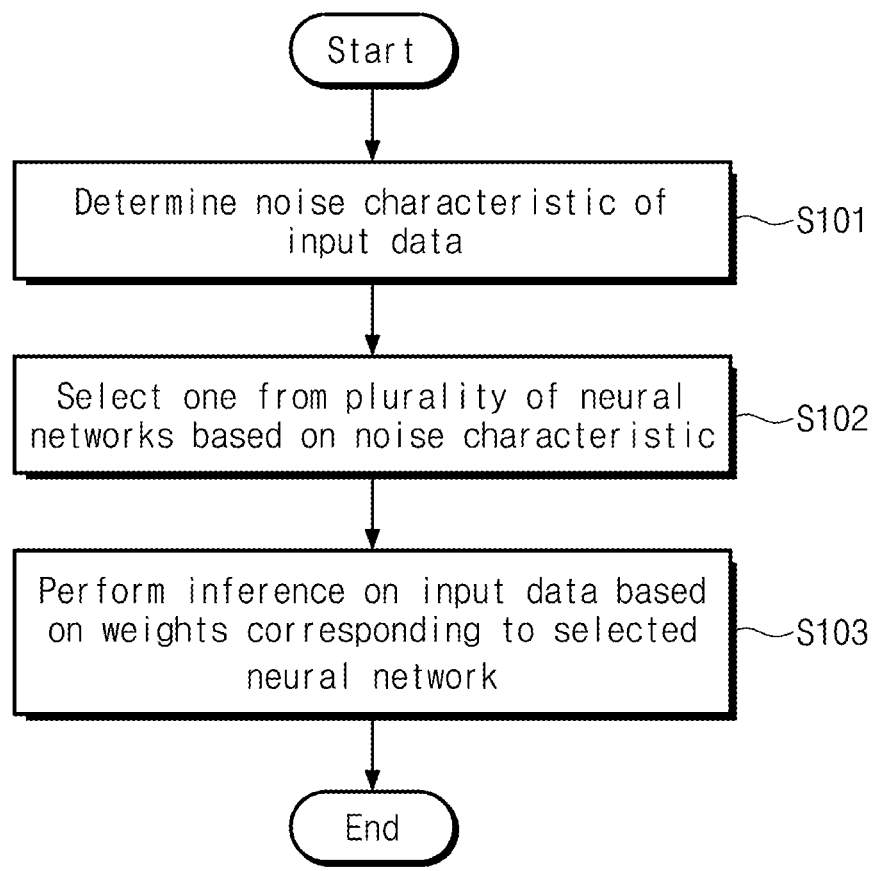
FIG. 10 is a flowchart illustrating an example of the operation of the neural processing device of FIG. 1.

FIG. 10 is a flowchart illustrating an example of the operation of the neural processing device of FIG. 1. Referring to FIGS. 1 and 10, in operation S101, the neural processing device 100 may determine a noise characteristic NSC of the input data IN. For example, the neural processing device 100 may determine the noise type $N\_t$ and the noise degree $N\_d$.

In operation S102, the neural processing device 100 may select one of the plurality of neural networks based on the noise characteristics NSC. For example, if the noise degree $N\_d$ is small, the neural processing device 100 may select a neural network with a high degree of sparsity (i.e., a small size). If the noise degree $N\_d$ is large, the neural processing device 100 may select a neural network with a low degree of sparsity (i.e., a large size).

In operation S103, the neural processing device 100 may perform inference on the input data IN based on the weights W corresponding to the selected neural network.

The neural processing device 100 may previously store the weights W determined through learning before performing the inference. The neural processing device 100 may perform learning based on the input data IN including various noise. The input data IN for learning may include noise corresponding to each of the combinations of the noise type $N\_t$ and the noise degree $N\_d$. The neural processing device 100 may learn the weights W corresponding to each of the plurality of neural networks through learning process. That is, the values of the weights W may be determined through learning process. In such a way, the neural processing device 100 may perform inference based on the learned weights W.

Figure 11:
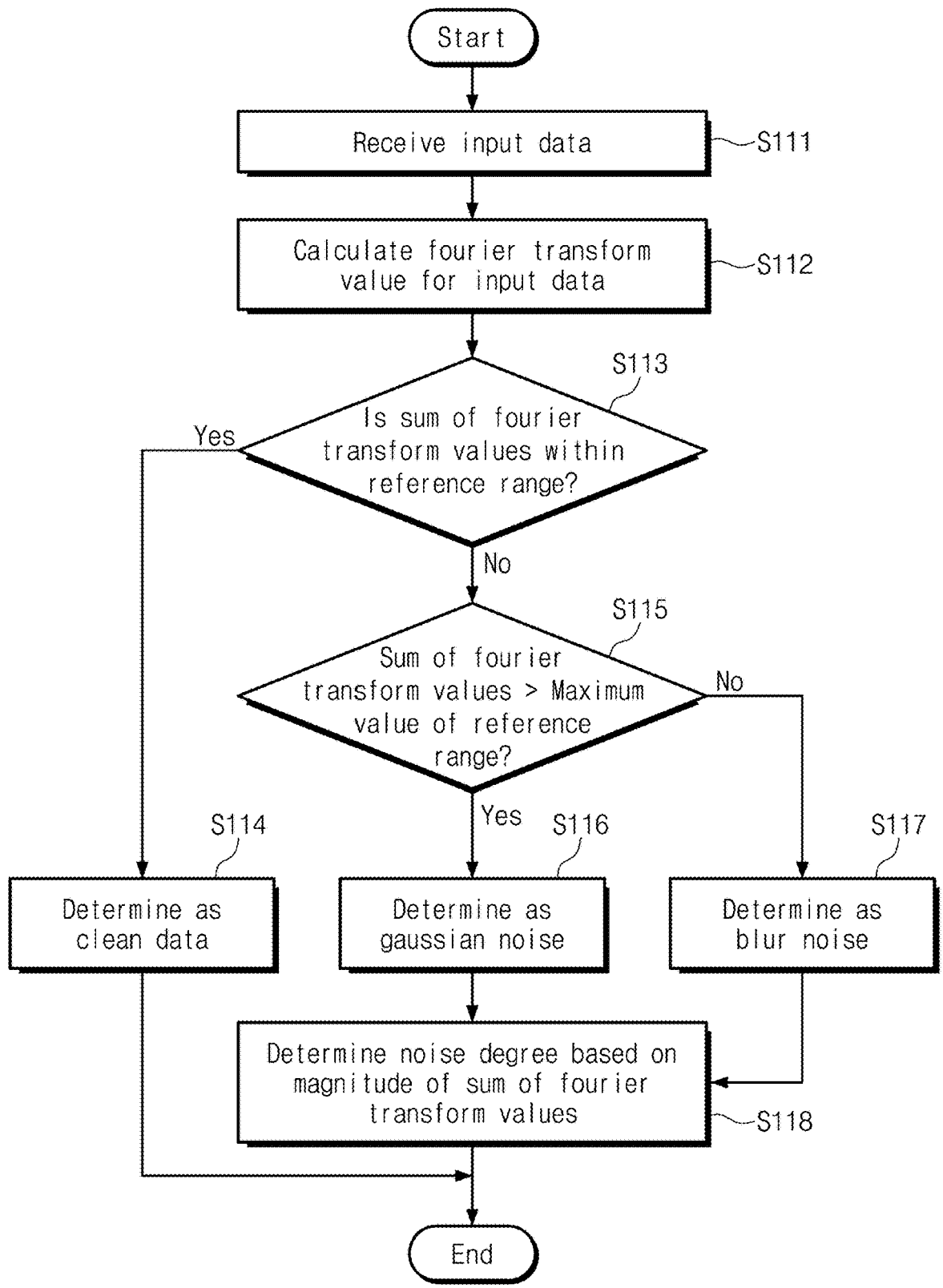
FIG. 11 is a flowchart illustrating one example of an operation in which the neural processing device of FIG. 1 classifies noise.

FIG. 11 is a flowchart illustrating one example of an operation in which the neural processing device of FIG. 1 classifies noise. Referring to FIGS. 1, 4, and 11, the neural processing device 100 may receive the input data IN in operation S111. In operation S112, the neural processing device 100 may calculate a Fourier transform value FTV for the input data IN.

In operation S113, the neural processing device 100 may determine whether the sum of the Fourier transform values FTV is within the reference range RFS. In the case that the sum of the Fourier transform values FTV is within the reference range RFS, in operation S114, the neural processing device 100 may determine the input data IN as clean data. That is, the neural processing device 100 may determine that the input data IN does not include noise.

If not, in operation S115, the neural processing device 100 may determine whether the sum of the Fourier transform values FTV is greater than the maximum value of the reference range RFS. If it is greater, the neural processing device 100 may determine the noise characteristic NSC of the input data IN as Gaussian noise in operation S116. If it is not greater (i.e., if the sum of the Fourier transform values FTV is smaller than the minimum value of the reference range RFS), the neural processing device 100 may determine the noise characteristic NSC of the input data IN as blur noise in operation S117.

In operation S118, the neural processing device 100 may determine the noise degree N_d based on the sum of the Fourier transform values FTV. For example, the neural processing device 100 may determine the noise degree N_d according to a difference size between the sum of the Fourier transform values FTV and the minimum value or the maximum value of the reference range RFS. Alternatively, the neural processing device 100 may determine the noise degree N_d according to the size of the sum of the Fourier transform values FTV.

Figure 12A:
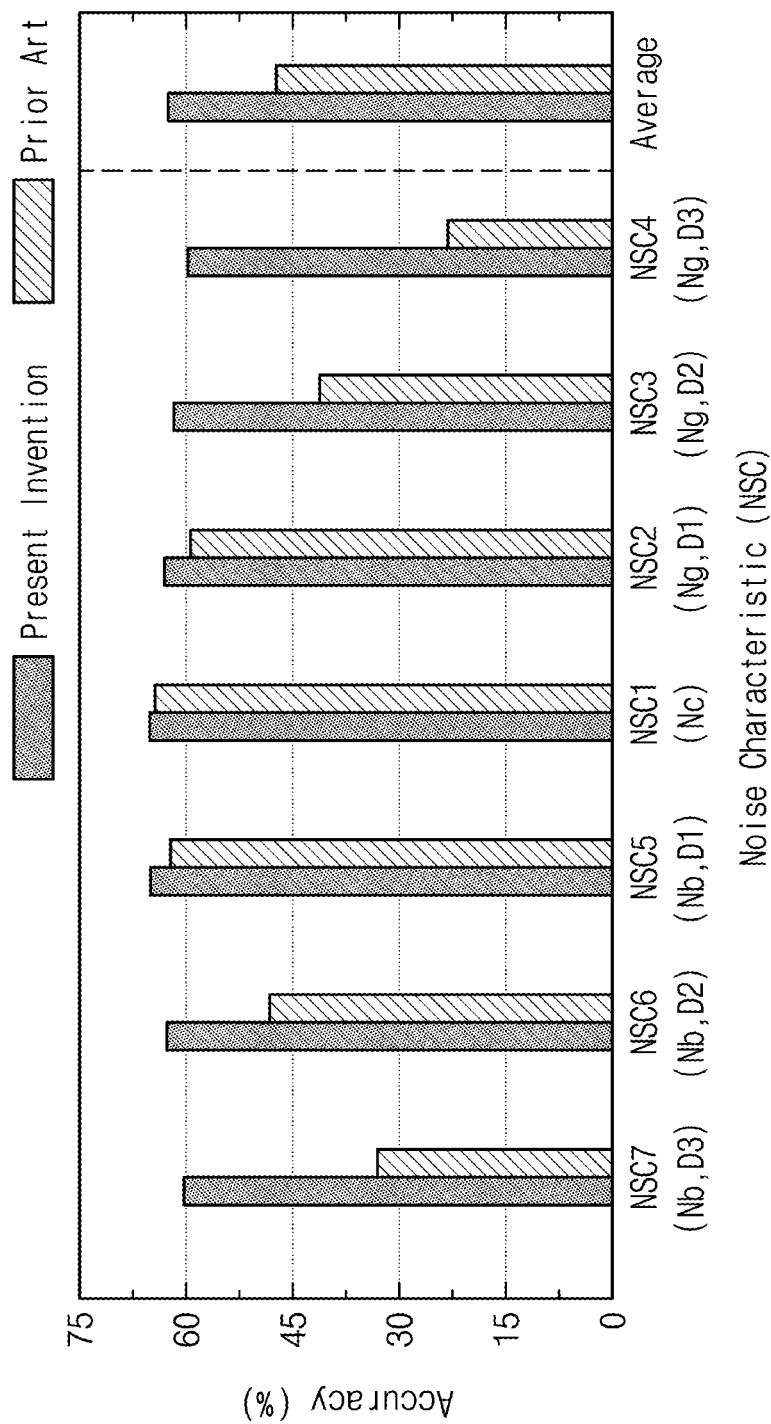
FIGS. 12A and 12B illustrates an example of comparison between the accuracy of an inference according to an embodiment of the inventive concept and the accuracy of an inference according to the prior art.
Figure 12B:
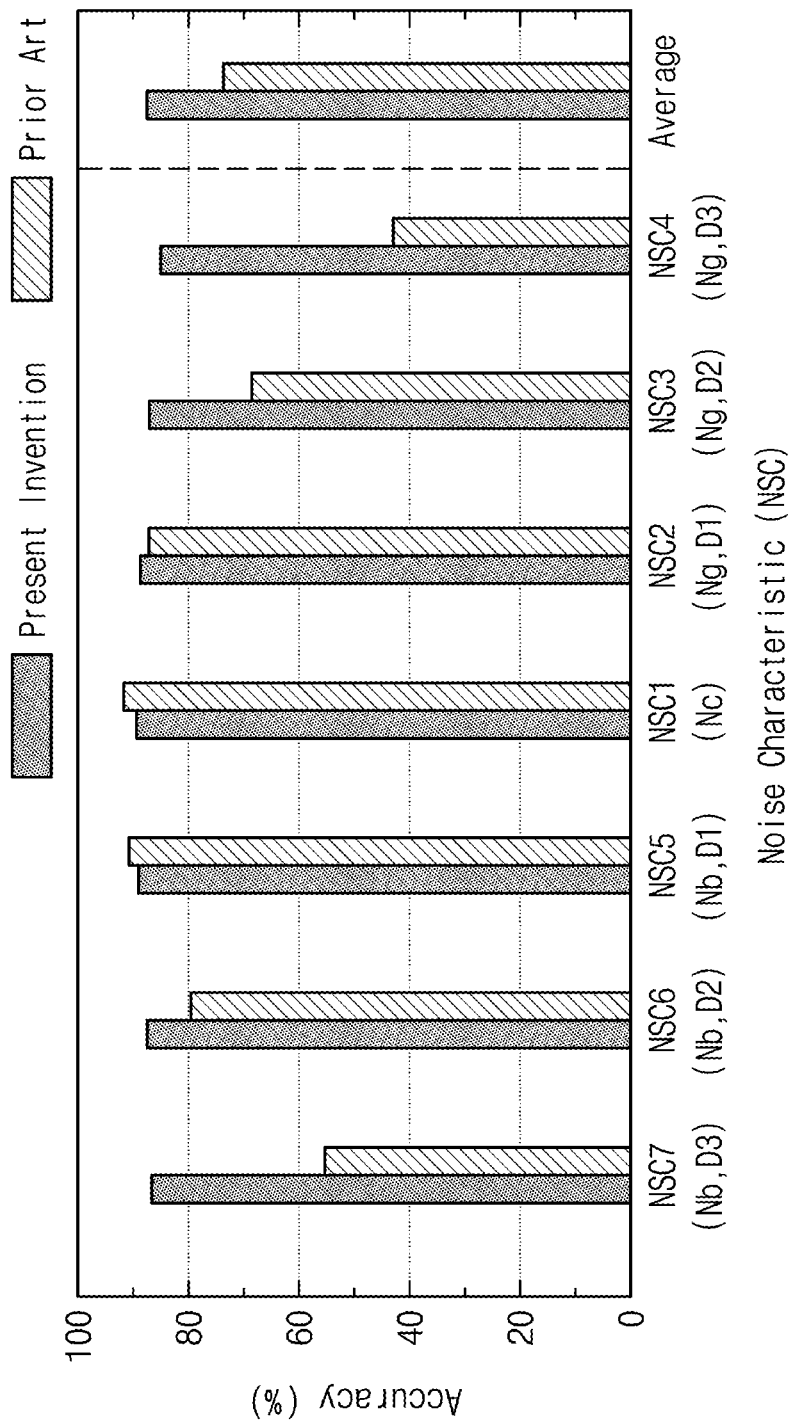

FIGS. 12A and 12B illustrates an example of comparison between the accuracy of an inference according to an embodiment of the inventive concept and the accuracy of an inference according to the prior art. The inference according to the embodiment of the inventive concept is performed based on the neural network selected according to the noise characteristic NSC. The inference according to the prior art is performed based on one neural network regardless of the noise characteristic NSC. FIG. 12A illustrates an inference result performed by using ResNet-18 network and CIFAR100 dataset. FIG. 12B illustrates an inference result performed by using VGG-16 network and CIFAR10 dataset. In FIGS. 12A and 12B, the horizontal axis represents a noise characteristic NSC, and the vertical axis represents the accuracy of inference. Referring to FIGS. 12A and 12B, an inference result for input data IN having first to seventh noise characteristics NSC1 to NSC7 of FIG. 7 is shown.

Referring to FIG. 12A, the accuracy of the inference according to the embodiment of the inventive concept is similar to the accuracy of the inference according to the prior art for input data IN having the first noise characteristic NSC1. However, in the inference for input data IN having a noise characteristic (e.g., the fourth noise characteristic NSC4 or the seventh noise characteristic NSC7) of which noise degree N_d is large, the difference between the accuracy of the inference is large. Accordingly, the average value of the accuracy of the inference according to the embodiment of the inventive concept is greater than the average value of the accuracy of the inference according to the prior art.

Referring to FIG. 12B, the accuracy of the inference according to the embodiment of the inventive concept is similar to the accuracy of the inference according to the prior art for input data IN having a noise characteristic (e.g., the second noise characteristic NSC2) of which noise degree N_d is small. However, in the inference for input data IN having a noise characteristic (e.g., the fourth noise characteristic NSC4 or the seventh noise characteristic NSC7) of which noise degree N_d is large, the difference between the accuracy of the inference is large. Accordingly, the average value of the accuracy of the inference according to the embodiment of the inventive concept is greater than the average value of the accuracy of the inference according to the prior art.

Figure 13:
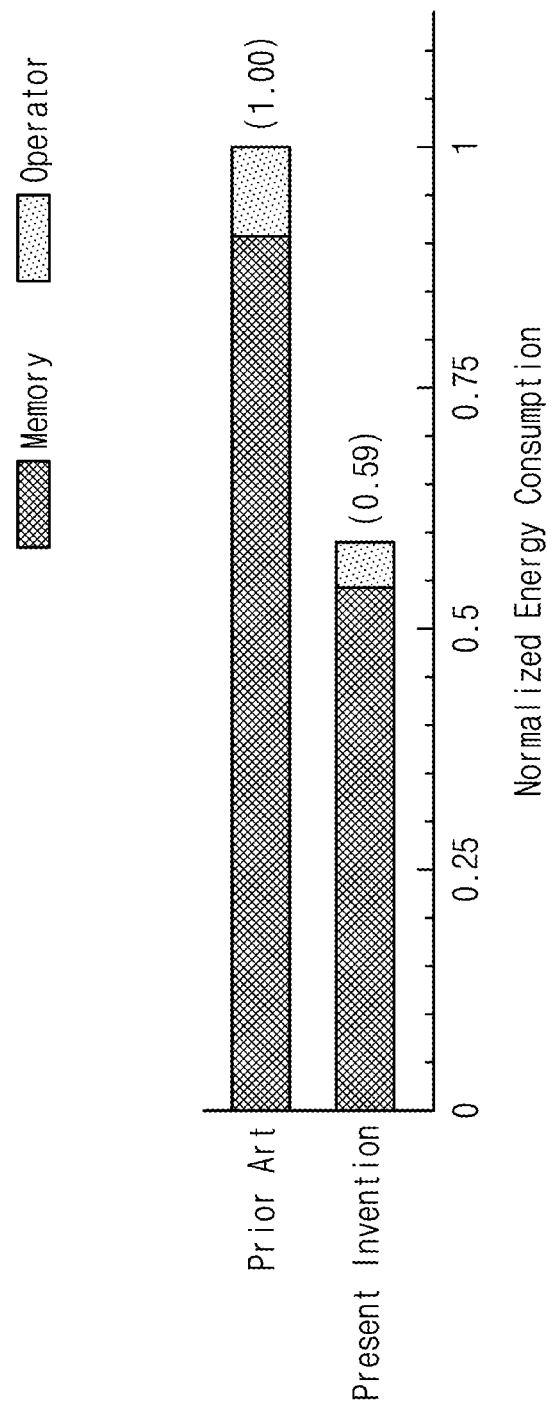
FIG. 13 illustrates an example of comparison between the energy consumption of an inference according to an embodiment of the inventive concept and the energy consumption of an inference according to the prior art.

FIG. 13 illustrates an example of comparison between the energy consumption of an inference according to an embodiment of the inventive concept and the energy consumption of an inference according to the prior art. The inference according to the embodiment of the inventive concept is performed based on the neural network selected according to the noise characteristic NSC. The inference according to the prior art is performed based on one neural network regardless of the noise characteristic NSC. In FIG. 13, the horizontal axis represents normalized energy consumption.

Energy consumption of the inference according to an embodiment of the inventive concept is smaller than energy consumption of the inference according to the prior art. For example, as shown in FIG. 13, if the energy consumption of the inference according to the prior art is '1', the energy consumption of the inference according to according to an embodiment of the inventive concept may be '0.59'.

According to the embodiment of the inventive concept, the energy consumption to operate the memory 130 and the operator 140 of FIG. 3 may be reduced. For example, the energy consumed to output weights W stored in the memory 130 may be reduced. In addition, the energy consumed to process data in the operator 140 and the energy consumed to temporarily store the processed data in internal or external buffer memory and output the data from the buffer memory may be reduced. Thus, the neural processing device 100 may operate at low power.

Figure 14:
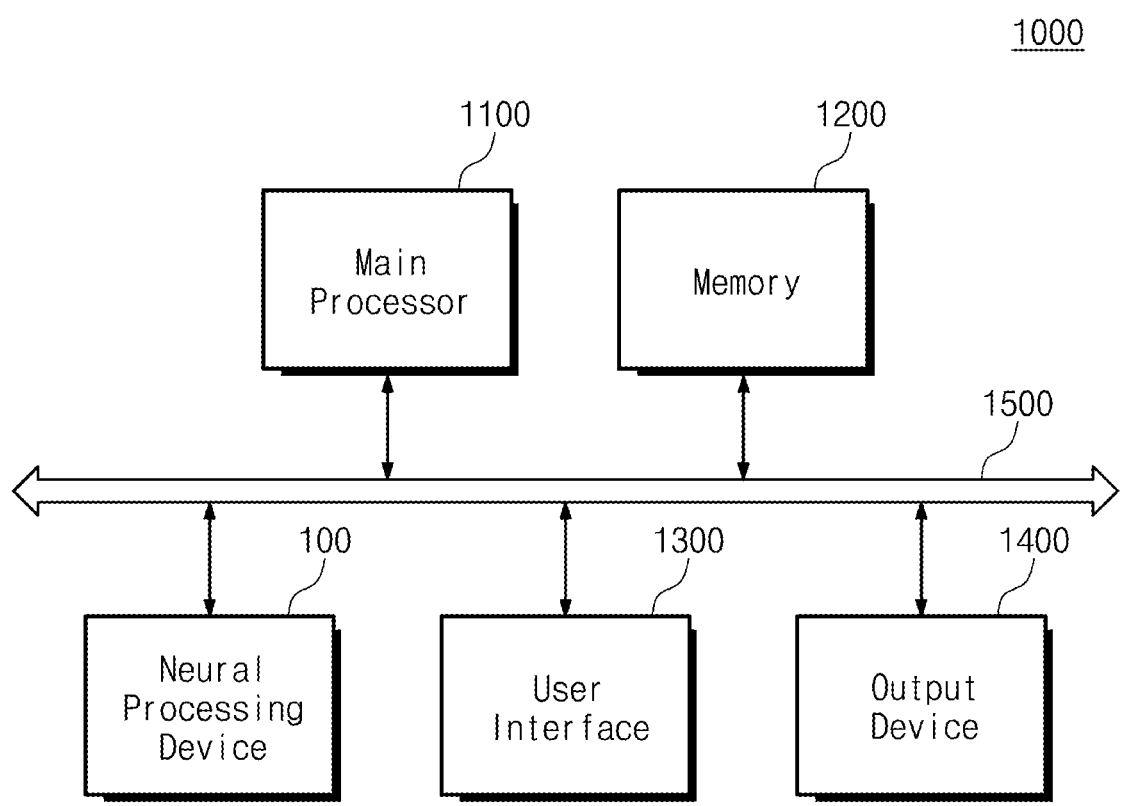
FIG. 14 is a block diagram illustrating a computing system including a neural processing device according to embodiments of the inventive concept.

FIG. 14 is a block diagram illustrating a computing system including a neural processing device according to embodiments of the inventive concept. Referring to FIG. 14, a computing system 1000 may include a main processor 1100, a memory 1200, a user interface 1300, an output device 1400, a bus 1500, and a neural processing device 100. The computing system 1000 may be implemented as a mobile device, a desktop, an embedded system, and a server.

The main processor 1100 may control the computing system 1000. The main processor 1100 may control the operation of the memory 1200, the neural processing device 100, and the output device 1400. For example, the main processor 1100 may process data stored in the memory 1200. The main processor 1100 may store the processed data in the memory 1200. The main processor 1100 may transmit data and commands to the components of the computing system 1000 through the bus 1500.

The memory 1200 may store data or output stored data. The memory 1200 may store data processed or data to be processed in the main processor 1100 and the neural processing device 100. For example, memory 1200 may be implemented as volatile memory or non-volatile memory.

The user interface 1300 may receive commands and data from a user. The user interface 1300 may be implemented as an interface capable of receiving various types of input. For example, the user interface 1300 may include a character based user interface CUI, a graphic based input user interface GUI, a natural user interface (NUI).

The output device 1400 may output the data processed in the main processor 1100 or the neural processing device 100. The output device 1400 may provide various types of outputs to the user. For example, the output device 1400 may be implemented as a display, a speaker, or the like.

The bus 1500 may deliver commands and data between components of the computing system 1000.

The neural processing device 100 may perform an inference operation based on the neural network under the control of the main processor 1100. The neural processing device 100 may perform inference on data received from the user interface 1300 or data stored in the memory 1200. The neural processing device 100 may deliver the inference result to the main processor 1100. The main processor 1100 may output the inference result to the user through the output device 1400. Alternatively, the main processor 1100 may control the computing system 1000 based on the inference result.

As described with reference to FIGS. 1 to 13, the neural processing device 100 may determine the noise characteristic NSC of the input data IN delivered through the bus 1500. The neural processing device 100 may perform inference based on the neural network corresponding to the determined noise characteristic NSC.

According to the embodiments of the inventive concept, it is possible to provide a neural processing device that performs inference with a desired accuracy while using less computational resources according to noise characteristics of input data.

Further, according to the embodiment of the inventive concept, it is possible to provide a neural processing device that operates at a low power.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A neural processing device comprising:
 a processor configured to execute computer-readable instructions stored in a memory such that the processor is configured to cause the neural processing device to,
  perform a preprocessing on input data to determine a noise characteristic of the input data,
  select one of a plurality of neural networks and weights associated therewith based on the noise characteristic and with reference to a weight table, the weight table stored in a memory and including a noise characteristic field, a neural network field, and a weight address field, the plurality of neural networks being neural networks previously learned based on various input data including various noise characteristics, and
  perform inference on the input data based on the selected weights corresponding to the selected neural network,
 wherein the processor includes a first neural network used to perform the preprocessing, and the selected neural network used to perform the inference as a second neural network, and the first neural network includes fewer layers and fewer neurons than the second neural network,
 wherein the noise characteristic comprises a noise type and a noise degree of the input data, and
 wherein the processor is further configured to learn weights corresponding to each of the plurality of neural networks based on input data including noise corresponding to a combination of the noise type and noise degree and perform the inference based on the learned weights.

2. The neural processing device of claim 1, wherein the processor is configured to determine the noise type and the noise degree based on Fourier transform values of the input data.

3. The neural processing device of claim 2, wherein
 when a sum of the Fourier transform values is greater than a maximum value of a reference range, the processor is configured to determine the noise type as Gaussian noise, and
 when the sum of the Fourier transform values is less than a minimum value of the reference range, the processor is configured to determine the noise type as a blur noise.

4. The neural processing device of claim 2, wherein the processor is configured to determine the noise degree based on a magnitude of a sum of the Fourier transform values.

5. The neural processing device of claim 1, wherein the processor is configured to determine the noise type and the noise degree based on a neural network.

6. The neural processing device of claim 1, wherein each of the plurality of neural networks is a network learned based on the input data.

7. The neural processing device of claim 1, wherein the processor comprises the weight table.

8. The neural processing device of claim 7, wherein the processor includes a dedicated memory that is configured to store weights of the plurality of neural networks and output the selected weights based on a weight address corresponding to the selected neural network.

9. The neural processing device of claim 4, wherein the processor is configured to determine the noise degree based on a difference the magnitude of the sum of the Fourier transform values and a minimum values or a maximum value of a reference range.

10. An operation method of a neural processing device, the method comprising:
 determining, by a first neural network included in a processor of the neural processing device, a noise characteristic of input data based on Fourier transform values of the input data, the noise characteristic including a noise type and a noise degree of the input data;
 learning weights corresponding to each of a plurality of neural networks based on input data including noise corresponding to a combination of the noise type and the noise degree;
 selecting, by the processor, one of the plurality of neural networks and weights associated therewith based on the noise characteristic and with reference to a weight table, the weight table stored in a memory and including a noise characteristic field, a neural network field, and a weight address field, the plurality of neural networks being neural networks previously learned based on various input data including various noise characteristics; and
 performing, by the selected neural network as a second neural network included in the processor, inference based on the learned weight, the performing including performing the inference on the input data based on the selected weights corresponding to the selected neural network,
 wherein the first neural network includes fewer layers and fewer neurons than the second neural network.

11. The method of claim 10, wherein
 when a sum of the Fourier transform values is greater than a maximum value of a reference range, the noise type is determined as Gaussian noise, and when the sum of the Fourier transform values is less than a minimum value of the reference range, the noise type is determined as a blur noise.

12. The method of claim 10, wherein the noise degree is determined based on a magnitude of a sum of the Fourier transform values.

13. The method of claim 12, wherein the noise degree is determined based on the magnitude of the sum of the Fourier transform values and a minimum values or a maximum value of a reference range.

14. An operation method of a neural processing device, the method comprising:
  determining, by a first neural network included in a processor of the neural processing device, a noise characteristic of input data, the noise characteristic including a noise type and a noise degree of the input data;
  learning weights corresponding to each of a plurality of neural networks based on input data including noise corresponding to a combination of the noise type and the noise degree;
  selecting, by the processor, one of a plurality of neural networks and weights associated therewith based on the noise characteristic and with reference to a weight table, the weight table stored in a memory and including a noise characteristic field, a neural network field, and a weight address field, the plurality of neural networks being neural networks previously learned based on various input data including various noise characteristics; and
  performing, by the selected neural network as a second neural network included in the processor, inference based on the learned weight, the performing including performing the inference on the input data based on the selected weights corresponding to the selected neural network,
  wherein the first neural network includes fewer layers and fewer neurons than the second neural network.

15. The method of claim 14, wherein the first neural network is a Convolutional Neural Network (CNN).

16. The method of claim 14, wherein the determining including determining the noise degree based on a magnitude of a sum of Fourier transform values of the input data and a minimum values or a maximum value of a reference range.

* * * * *